(12) United States Patent
Odnert et al.

(10) Patent No.: US 12,105,710 B2
(45) Date of Patent: Oct. 1, 2024

(54) PREFERRED STORAGE OF AGGREGATE DATA ITEMS

(71) Applicant: AtScale, Inc., San Mateo, CA (US)

(72) Inventors: Daryl Odnert, Los Altos, CA (US); Patrick J. Toole, Wellington, FL (US); Sarah Gerweck, San Mateo, CA (US); Joseph Barefoot, San Fransico, CA (US); Rouzbeh Safaie, San Francisco, CA (US)

(73) Assignee: AtScale, Inc., Boston, MA (US)

( * ) Notice: Subject to any disclaimer, the term of this patent is extended or adjusted under 35 U.S.C. 154(b) by 0 days.

(21) Appl. No.: 18/139,077

(22) Filed: Apr. 25, 2023

(65) Prior Publication Data

US 2023/0342360 A1    Oct. 26, 2023

Related U.S. Application Data

(60) Provisional application No. 63/334,329, filed on Apr. 25, 2022.

(51) Int. Cl.
*G06F 16/24* (2019.01)
*G06F 16/2453* (2019.01)
*G06F 16/2455* (2019.01)
*G06F 16/28* (2019.01)

(52) U.S. Cl.
CPC .. *G06F 16/24544* (2019.01); *G06F 16/24561* (2019.01); *G06F 16/283* (2019.01)

(58) Field of Classification Search
CPC ......... G06F 16/24544; G06F 16/24561; G06F 16/283
See application file for complete search history.

(56) References Cited

U.S. PATENT DOCUMENTS 9,600,554 B2 * 3/2017 Gerweck ............... G06F 16/283
2023/0409624 A1 * 12/2023 Paula .................... G06F 40/205

\* cited by examiner

*Primary Examiner* — Loc Tran
(74) *Attorney, Agent, or Firm* — Armis IP Law, LLC

(57) ABSTRACT

A preferred aggregate store for a multidimensional database receives and stores intermediate data generated as part of a larger query for avoiding repetitive or redundant data retrievals incurring costly data paths. Aggregates include intermediate tables and sets of data, often generated from a join of two or more distinct data tables, combined for generating a query result. In the event an aggregate is called for, certain storage locations may be preferable to others due to network distance, fees for storage and processing, as in the case of cloud storage, or write accessibility. Designation of a preferred aggregate store ensures that aggregates called for by the query processing are stored in a beneficial location for cost and efficiency.

17 Claims, 4 Drawing Sheets

IDENTIFY A PLURALITY OF DATA SOURCES USED IN SATISFYING A QUERY REQUEST, EACH DATA SOURCE OF THE PLURALITY OF DATE SOURCES LOCATED IN A DISTINCT NETWORK LOCATION OF THE NETWORK
302

DETERMINE AN AGGREGATE DEFINED BY A PORTION OF DATA IN ONE OR MORE OF THE DATA SOURCES OF THE PLURALITY OF DATA SOURCES USED IN SATISFYING THE QUERY;
304

RECEIVE A DESIGNATION OF A PREFERRED AGGREGATE STORE, THE PREFERRED AGGREGATE STORE HAVING A MORE FAVORABLE ACCESS PATH THAN THE DATA SOURCE FROM WHICH THE DETERMINED AGGREGATE EMANATES
306

IDENTIFY FOR EACH OF THE PLURALITY OF DATA SOURCES, A NETWORK COST ASSOCIATED WITH OBTAINING A RESPECTIVE PORTION OF DATA IN EACH OF THE DATA SOURCES; AND
308

DESIGNATE THE PREFERRED AGGREGATE STORE FROM THE LOWEST NETWORK COST FROM AMONG THE DATA SOURCES HAVING A PORTION OF THE DATA FOR SATISFYING THE QUERY
310

COMPUTE THE AGGREGATE BY MOVING THE CORRESPONDING PORTION OF DATA TO THE PREFERRED AGGREGATE STORE FOR SATISFYING THE QUERY REQUEST
312

*FIG. 3*

PREFERRED STORAGE OF AGGREGATE DATA ITEMS

RELATED APPLICATIONS

This patent application claims the benefit under 35 U.S.C. § 119(e) of U.S. Provisional Patent App. No. 63/334,329, filed Apr. 25, 2022, entitled "PREFERRED STORAGE OF AGGREGATE DATA ITEMS" incorporated herein by reference in entirety.

BACKGROUND

Electronic databases store tremendous amounts of data, and have been doing so for several decades ever since the cost of computer hardware came within reach for most businesses and consumers. Large "data warehouses" now store vast amounts of data stored and indexed according to a storage format, often according to tables or multidimensional arrangements that allow access to the data though interfaces and software defined by the particular vendor. Databases, whether denoted as a database, data warehouse, disk farm or storage network, accumulate intermediate data sets during processing of a query, often result from subsets of one or more constituent data tables included for satisfying the query request.

SUMMARY

A preferred aggregate store for a multidimensional database receives and stores intermediate data generated as part of a larger query for avoiding repetitive or redundant data retrievals incurring costly data paths. Aggregates include intermediate tables and sets of data, often generated from a join of two or more distinct data tables, combined for generating a query result. In the event an aggregate is called for, certain storage locations may be preferable to others due to network distance, fees for storage and processing, as in the case of cloud storage, or write accessibility. Designation of a preferred aggregate store ensures that aggregates called for by the query processing are stored in a beneficial location for cost and efficiency.

Configurations herein are based, in part, on the observation that complex queries reference data from a number of data fields, or dimensions, and can incur substantial computation and network burdens in accumulating and processing referenced data fields for computing a query result. Multidimensional databases allow queries based on many dimensions, or fields, of data. A so-called datacube arrangement provides a virtual schema that allows a user to approach all data fields as if they were a single data entity (file, table, or storage volume). In actual implementation, data is often stored in tables or lists of no more than two dimensions. The queried data may also be physically stored in different network locations, and may be in different storage formats. A query processing approach includes a query planner and an execution engine that identifies the data sets (tables) called for by a query, and implements needed joins, projections and selections for traversing all the dimensions in a datacube that are called for by the query request. Aggregates are predicted and created as intermediate data sets from multiple tables. The user, therefore, need not know the individual tables and relations between the tables, but need only issue a query request using declarative field names. In an example arrangement, an aggregate prediction and creation component, separate from the query planning component, uses the output of the query planner (i.e. the query plan) along with properties of the datacube and statistics about the underlying tables in order to make decisions about whether any aggregate tables should be created. The purpose of these aggregate tables is to reduce the cost of FUTURE queries that access the same data. Aggregates are not created for the purpose of executing the "current" query, for which the user needs a result as soon as possible. Once an aggregate table is built, it becomes available for the query planner to use in the planned execution of subsequent queries Unfortunately, conventional approaches to execution of datacube queries store the aggregates in available storage volumes, typically based on the location of the data sets from which the aggregates are drawn. Depending on the access rights and network orientation of the query requestor, the aggregates may be stored in a sub-optimal location, such as one that incurs storage fees or access issues. Accordingly, configurations herein substantially overcome the shortcomings of conventional approaches by specifying a preferred aggregate store, which is known to have favorable access and proximity to the requesting user. By directing aggregate creation in the preferred aggregate store, failures due to user access preferences, and cost increases from storage and processing subscriptions are ameliorated. In some instances, the datacube (as configured by the user) indicates to the query service/components that it is not allowed to write aggregates in certain locations. And if all of the user's source data is read from data warehouses where the service cannot write aggregates, then the preferred aggregate store provides a place for aggregates that otherwise our service would not be able to create at all.

In further detail, a multidimensional database, as represented by a datacube and corresponding virtual schema, has a plurality of data sources at different network locations, and each network location contributing one or more fields for satisfying a query request. A method for generating and storing aggregates includes identifying a plurality of data sources used in satisfying a query request, where each data source of the plurality of data sources may be located in a distinct network location of the network, on different servers/nodes and possibly having different database management.

An aggregate is defined by a portion of a query in one or more of the data sources of the plurality of data sources is used in satisfying the query, such as a join on selected or returned fields. In many cases, the most commonly used aggregate form is an aggregation of numeric values (measures) grouped by zero or more dimensional values. For example, a single entry in the virtual data cube might represent an individual retail transaction for a business. An aggregate table might contain the SUM and the AVERAGE of the sales amount grouped by the calendar month in which the transaction occurred. (SUM and AVERAGE are examples of "aggregation functions" in data query languages.) If a future query requires the monthly sales totals, it may be retrieved from the aggregate table much more efficiently than from the original transaction data.

The query planner or execution engine receives a designation of a preferred aggregate store, such that the preferred aggregate store has a more favorable access path than the data source from which the determined aggregate emanates. The aggregate is computed by moving the corresponding portion of data to the preferred aggregate store for satisfying the query request, thus locating the results of the join or other operation in better proximity for the full query.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a flowchart of query processing using a preferred aggregate in the environment of FIG. 1.

DETAILED DESCRIPTION

Figure 1:
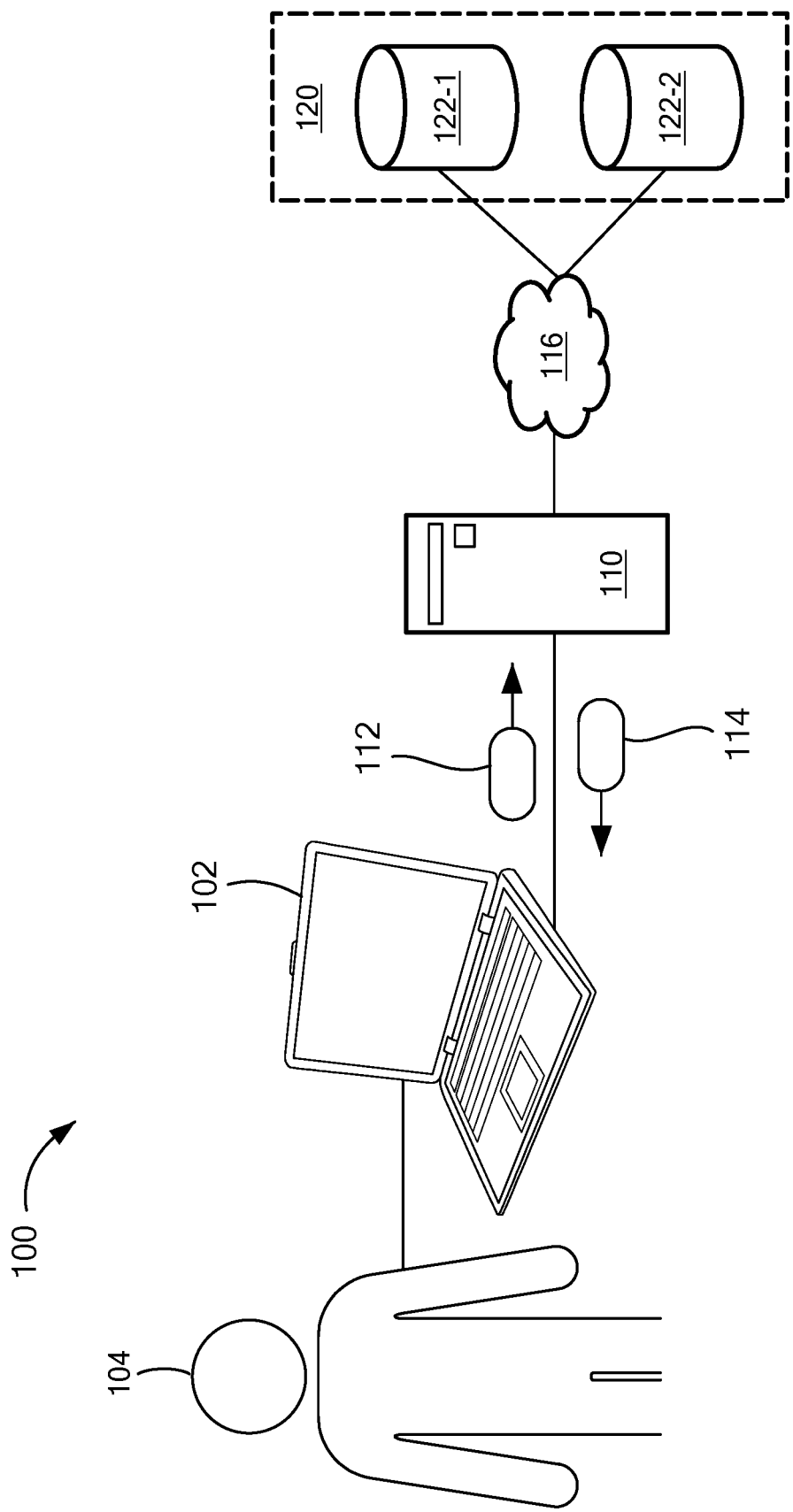
FIG. 1 is a context diagram of a database environment suitable for configurations herein.

Various configurations depicting the above features and benefits are shown and described further below. Configurations disclosed below present an example configuration and implementation of a preferred aggregate store in directing aggregate stores to a specific network location. Other uses may be envisioned based on the examples below. Network architectures are typically unique and dynamic, and network arrangements other than the examples presented herein may also benefit from the disclosed approach.

The designation of the preferred aggregate store provides optimizations for the execution of queries against a virtual schema. There are scenarios where the response time for a query that remains directed to the primary data store underlying the virtual schema may be delayed because the primary data store is not amenable to aggregates. For example, the query may need to scan a very large amount of data to compute the results. Or the data may be located in a cloud-based storage service with inherent overhead delays applied to all queries. Also, the underlying data may be sourced from a service where temporary aggregations lack privileges to be created. In these scenarios, it is desirable to have pre-aggregations or replications of the underlying data available in a database that is "close to" the virtual query execution processor, enabling the query response time to be greatly reduced relative to fetching the results from the primary source. This "faster" or "closer" storage system is identified as the "preferred" location for aggregations to be stored, rather than relying on a default or primary data store.

In addition to the potential performance advantages, there may also be cost savings that result. Some data warehouse services charge their customers based on the number of queries executed or the amount of data that is scanned or parsed by each query. Query users can utilize their available data storage more effectively by "steering" or directing the aggregates to known, lower cost or owned data stores.

Relational databases employ natural language-like syntax for queries formed in SQL (Structured Query Language) or MDX (Multidimensional Expression). These query languages abstract details associated with actual data access of the mnemonically named fields. Each one of these fields is typically a dimension in a multidimensional database, and is represented by a datacube and corresponding virtual schema. Thus, each dimension may reside in one of a plurality of data sources at different network locations, and each network location contributes one or more fields for satisfying a query request. Interpretation of relational database statements directed at multidimensional databases is disclosed in U.S. Pat. No. 9,600,554, to AtScale, Inc., of San Mateo CA, assignee of the present application and incorporated herein by reference in entirety.

Multidimensional models and data warehouses have evolved to accommodate larger volumes of data and more extensive insights into that data, users remain most familiar with the traditional data structures (e.g., relational), query languages (e.g., SQL), and associated analysis tools (e.g., Tableau, Excel, QlikView, etc.), that are commonly used for operational data. In contrast, manipulating data stored using multidimensional data models and data warehouses can require expert computer science skills. Users generally desire to take full advantage of the multidimensional richness of a broad range of subject data and structures using a familiar relational data analysis environment. Legacy techniques can pre-process and/or transform the subject data (e.g., from the distributed file system or data warehouse) for presentation to the relational data analysis tools. However, such legacy techniques are implemented as batch processes and are limited in resource efficiency, data accuracy, schema flexibility, and other performance characteristics.

Storage of aggregates as disclosed herein is particularly beneficial with a subset of dimensions called out in a multidimensional query. Aggregate storage is operable in a projection of a multidimensional data view of a subject database on to a relational data analysis environment to enable real-time data analyses. Certain embodiments are directed to technological solutions for receiving a relational database statement (e.g., query) comprising relational metadata mapped to a virtual multidimensional representation of a subject database, and generating a subject database statement based at least in part on the relational database statement and the virtual multidimensional representation, and configurable to operate on the subject database to produce a visualization result set, which embodiments advance the technical fields for addressing the problem of projecting a multidimensional data view of a subject database on to a relational data analysis environment to enable real time data analyses, as well as advancing peripheral technical fields. The disclosed embodiments modify and improve over conventional approaches. In particular, practice of the disclosed techniques reduces use of computer memory, reduces demand for computer processing power, and reduces communication overhead needed for interpreting relational database statements using aggregate storage in the context of a virtual multidimensional data model.

FIG. 1 is a context diagram of a database environment suitable for configurations herein. Referring to FIG. 1, a multidimensional database query environment 100 provides a user 104 with access to a query engine 110 via a computing device 102. The query engine 110 is a server or remote computer that receives, processes and returns a query result 114 in response to a query request 112 from the user. The query engine 110 provides the ability to make queries against a complex cube where the composition of that cube has been provided for the user (or created by the user) ahead of time. A virtual schema provides a workable view of a complex datacube storage implementation and query processing network, discussed further in FIG. 2 below. The query engine 110 shields the user 104 from the need to specify storage locations and network paths needed to access the data sets called for by the query request 112; rather, the datacube defines the multidimensional database that maps the queried fields to stored tables and dimensions of the tables for generating the needed aggregates and computing the query result 114. The user need not have knowledge of the physical database structure exhibited by the datacube 120.

The datacube 120 is defined by a network 116 connection to a plurality of data stores 122-1 . . . 122-2 (122 generally).

The query engine 110 identifies the network location of relevant data stores 122, applies the fields and data items from the query request through a virtual schema, and accesses the data stores 122 for retrieving the fields and dimensions needed for the query result.

The data stores as defined herein may be any suitable physical storage location, including data warehouses, disk farms, cloud storage, dedicated enterprise (company internal) storage servers/networks or other non-volatile storage. In most instances, data is stored in tables, defined by fields and entries, typically labeled as columns and rows, respectively. Other formats such as JSON (javascript object notation) and similar nested syntax may also be invoked. The query request 112 generally calls out fields and values, where each field defines a dimension of the datacube 120. Field values are correlated or mapped to corresponding fields of other tables, therefore defining additional dimensions. A complex arrangement of data tables, each defining one or more dimensions, and data stores 122, each defining a network location for storing the tables, forms the full datacube 120 for querying multiple dimensions of data from a user perspective of a single data table. When a query request 112 calls out fields stored in multiple tables, aggregates are formed, usually temporary tables, to effectively combine the fields from different tables, transparently to the user.

Figure 2:
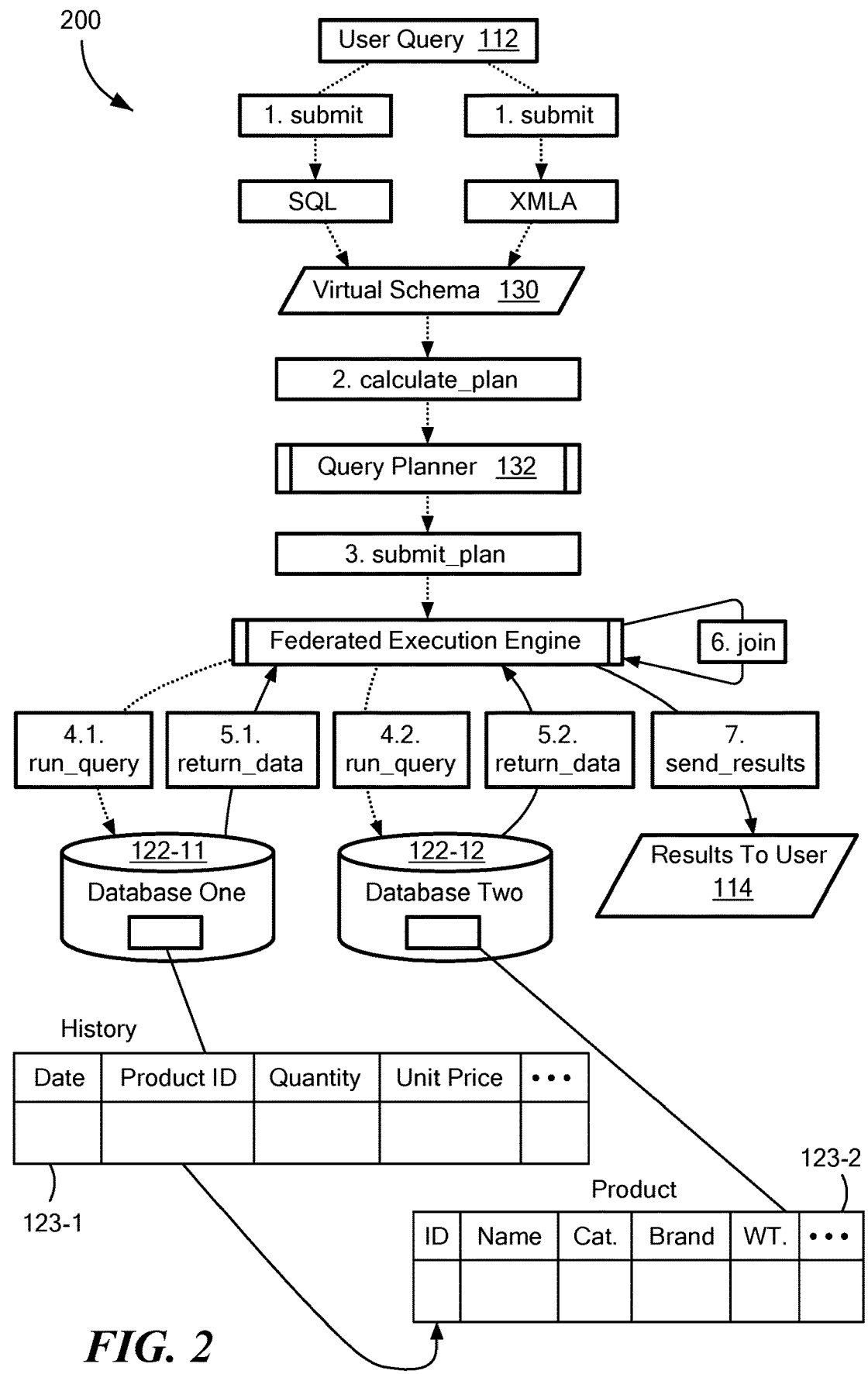
FIG. 2 is block diagram of query processing of a multidimensional database in the environment of FIG. 1.

FIG. 2 shows a query processing system 200 of a multidimensional database in the environment of FIG. 1. Referring to FIGS. 1 and 2, there are two database systems employed as data stores 122-11, 122-12. There are no fundamental limitations on the number of data stores. Additional databases could be connected and identified as a location for data (tables) that are referenced by the virtual schema 130.

One or more databases may be designated in the virtual schema as a preferred aggregate store 122'. This designation is a hint to the query planner 132 and an aggregate prediction system that the performance characteristics or the write-permissions of that database are preferable to other locations where aggregations could be stored. The aggregate prediction system makes use of this hint when deciding what aggregations should be created and where they should be stored. The query planner makes use of this hint when deciding which is the most efficient data store 122 to use for a query's execution plan.

A database designated as a preferred aggregate store is not limited to storing aggregates created by an aggregate prediction system. That same database may be the location of source dataset (tables) that are referenced by the virtual schema. In other words, the preferred aggregate store may already be utilized for the query; designating it as such ensures that it will also be used for aggregate creation.

FIG. 3 is a flowchart of query processing using a preferred aggregate in the environment of FIG. 1. Referring to FIGS. 1-3, in a multidimensional database having a plurality of data sources at different network locations, such that each network location contributes one or more fields for satisfying a query request, generation and storage of aggregates improves performance. The aggregates can be thought of as "subqueries" that would otherwise be redundantly generated multiple times by a single query request. Upon receiving the query request 112, the query planner 132 identifies a plurality of data sources 122 used in satisfying the query request 112, as depicted at step 302. Each data source may be located in a distinct location of the network, meaning a different network exchange is needed to access each data source. Each data source is accessed through an established interface over the network, and may include various transfer protocols and packet switched transport mechanisms. Access may be via a native file system or database management system (DBMS) under which the data source is maintained. The respective data source may be a database table managed by a vendor specific DBMS interface, flat file, multidimensional data cube and/or unstructured or so-called "big data" repository. It should be apparent from the discussion above that a data cube implies multiple dimensional data sources, each of which may itself be structured as a data cube.

Each data source 122 is generally a network location, distinct from other data sources by at least an IP address, and likely geographic distinctions. Each data source 122 has a local database management system, file structure, or access method, and usually stores a number of tables, data sets or files, depending on the access. Different physical volumes may be used, but typically for multi-volume recovery and redundancy, such as volume shadowing, RAID (Redundant Array of Interconnected Disks) and similar storage mechanisms. To the query planner 132 the data source 122 generally appears as a collection of one or more tables at a network location/address/URL.

Upon receiving the query request 112, the query planner determines that an aggregate should be defined by a portion of data in one or more of the data sources of the plurality of data sources used in satisfying the query, as shown at step 304. Satisfaction of the query will require fields from multiple data sources 122, such as through a join of tables. The aggregate may include, for example, a join between the two tables for the fields referenced in the query. This is preferable to either copying one table in entirety, as all fields, not just the ones called for by the query, would be copied. It is also preferential to performing the join remotely, as a network transaction would be incurred for each joined entry. The aggregate provides the portion of data from each table that is called for by the query. A single join, once stored, can persist for the duration of the query—recall that other subqueries may rely on the aggregate.

The query planner 132 receives a designation of a preferred aggregate store, such that the preferred aggregate store has a more favorable access path than the data source from which the determined aggregate emanates, as depicted at step 306. The more favorable access path may result from a variety of conditions. Selection of the preferred aggregate store results from identifying, for each of the plurality of data sources, a network cost associated with obtaining a respective portion of data in each of the data sources. The preferred aggregate store may be closer, and incur less network overhead. It may be in a server owned by the query requestor, whereas the source data store imposes fees for data storage. There may also be write access issues, where access privileges to write to the queried data store cannot be obtained.

The preferred aggregate store may be designated based on the lowest network cost from among the data sources having a portion of the data for satisfying the query, as shown at step 310. The determination of network cost may be defined according to any suitable metric, as different users/organizations may encounter a myriad of access and service based factors. Once identified, the query planner 132 computes the aggregate by moving the corresponding portion of data to the preferred aggregate store for satisfying the query request, as depicted at step 312.

Figure 4:
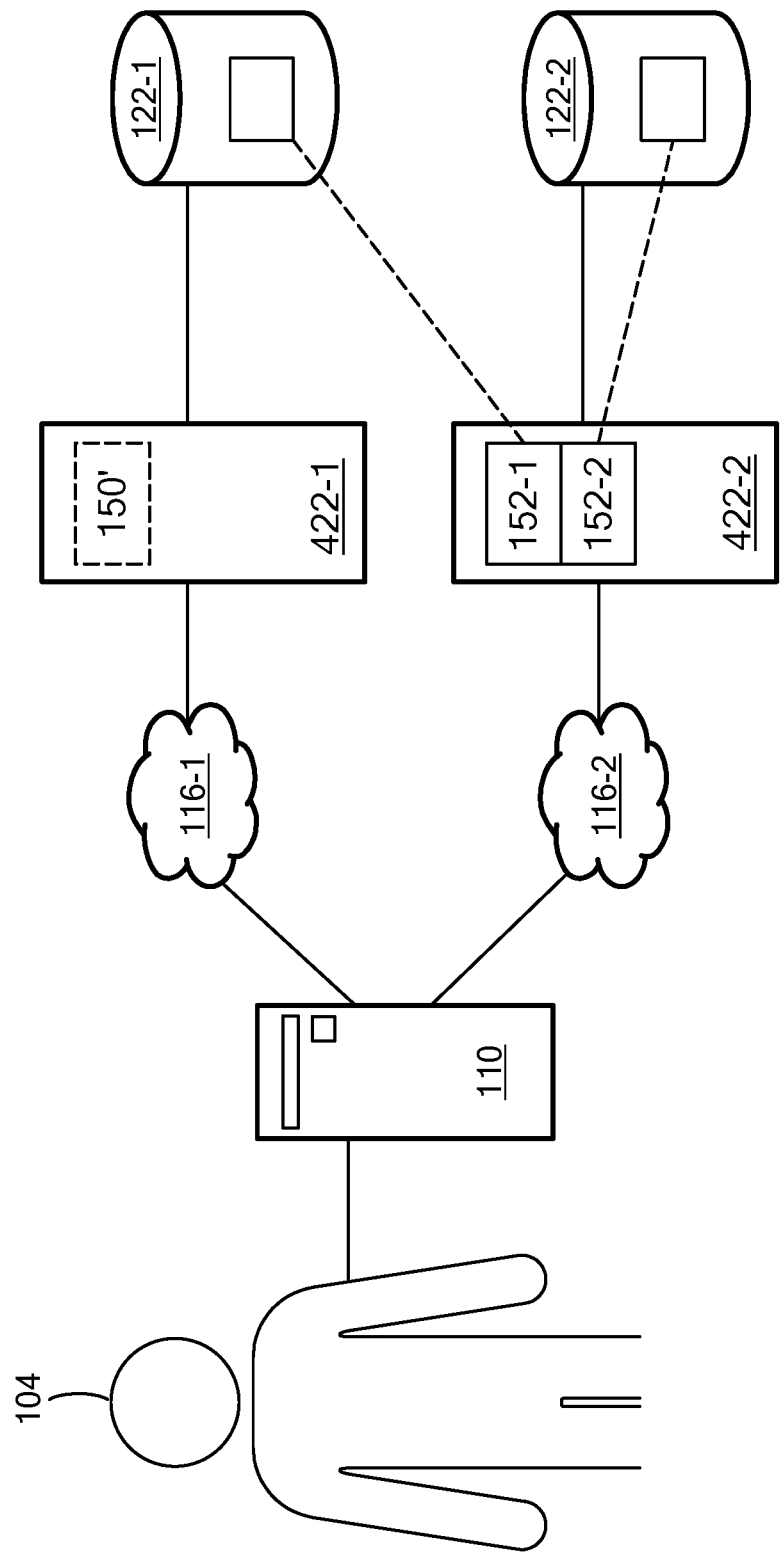
FIG. 4 is an example of storing a preferred aggregate in response to a query according to the flowchart of FIG. 3.

FIG. 4 is an example of storing a preferred aggregate in response to a query according to the flowchart of FIG. 3. Referring to FIGS. 1-4, the aggregates generally define a portion of a query including data required for the query request in a different, and more favorable, network location than the source data. This can provide query time optimization by performing computationally intensive joins once, and locating at or nearer to the query engine than the constituent data stores from which the aggregates derive. In the case of storage fees, often applied for cloud storage, aggregates can be directed to lower cost locations or to repositories owned by the query submitter.

In FIG. 4, an example on the network of FIG. 1 is shown. An aggregate 150 is based on a first data store 122-1 and a second data store 122-2, such that each of the first and second data stores have respective portions 152-1, 152-2 of the data used in satisfying the query. It should be clarified that the data stores 122 used for the querying of multiple dimensions each have storage and processing capacity for supporting the aggregate 150. Typically, each data store has at least some database management capability, meaning an ability to process data. Decisions regarding data retrieval, query and aggregate processing are performed by the query planner. A data store that is dedicated to storage only, such as a network attached storage (NAS) device, might be only capable of storage, not processing, however the query planner 132 would consider this during aggregate storage selection.

It should be noted that the preferred aggregate store may be distinct from the data sources having a portion of the data for satisfying the query. Generally, determination of which data store store is the "preferred aggregate store" is identified by the virtual schema. However, it is also true that as the aggregate system is predicting new aggregates, it must also make a decision about where the aggregate should be stored. So, there is a sense in which the system is selecting a preferred location for each aggregate and that may or may not be the location designated as the "preferred aggregate store".

In the example of FIG. 4, the query planner 132 might consider an intermediate data store 422-1 is designated for storing the computed aggregate 150'. However, a network cost is compared for accessing the computed aggregate at the intermediate data store with a network cost for accessing the computed aggregate from a preferred aggregate store. Such a network cost may include one or more of a data access subscription, write access privileges, transmission time, and cloud storage fees. The query planner 132 generates the aggregate 150 from a join of dimensional data from the portion of data 152-1, 152-2 at each respective data source of the plurality of data sources. Based on the comparison, or other preference indication, the query planner stores the computed aggregate 150 at the preferred aggregate store 422-2. The join is stored at the preferred aggregate store, and the query result generated from accessing the aggregate 150 join from data store 422-2, rather than 422-1. The end result is that default or predetermined logic for selecting which data store 122 to use for an aggregate can be shifted or mandated based on the preferred aggregate selection.

Returning to the full query engine of FIG. 2, a further example employs data store 122-11 as database one, and data store 122-12 as database 2. The following conditions are present:

Database One is a cloud-hosted service containing a table representing the history of products sold. Each row of a sales history table 123-1 represents the sale of a particular product, on a particular date. The table includes columns that indicate:
The date of sale The product ID of the product that was sold
The quantity of the product that were sold in this transaction
The unit price of the product in this transaction
Additional columns that identify other attributes of the transaction Assume that the sales history table is very large, perhaps containing many millions of rows from product sales over a long period of time.

The product ID column in the sales history table 123-1 is a foreign key used to locate information about that product in a product table 123-2. The product table includes columns that identify the product's name, its product category, its brand name, its shipping weight, etc.
Product table is stored in Database Two.
Database Two is a relational database service located in the same data
center as the execution engine system.

Assume that the virtual schema 130 has identified the sales history table and the product table as data sources, and has modeled a measure "total value" that can be calculated from each row of the sales history table (equal to quantity× unit price). Also, the virtual schema has defined dimensions from the Product table by which these measures can be grouped.

An example user query sent to the query engine system could request the total value of products sold, grouped by the product category. The SQL query might look be syntactically represented as:

```
SELECT SUM(total_value), product_category
FROM product_sales_cube
GROUP BY product_category
```

The query planner 132 will consult the virtual schema 130 and determine that the query is requesting the sum of the "total value" measures from rows of the sales history table, after grouping those rows by the product category. The product category for each row is determined by joining the sales history table with the product table based on the product ID.

If Database Two Is Not Identified as a Preferred Aggregate Store:
In the absence of the recommendation to use Database Two as the Preferred Aggregate Store, in response to the example query, the following actions would occur:
1. Create a copy of the product table in Database One, because it is generally more efficient to move dimensional data to where the fact table is.
2. Create an aggregate table in Database One grouping the "total value" measure either by product ID or by product category.

Later, if the same query is requested again and the above mentioned actions are completed, the query can be answered entirely from tables that are in Database One, and no cross-database joins are required. This should improve the performance of the query when compared to the originally executed query. However, it is still a query to a cloud-based system that may have network or service-related delays associated with the request processing.

If Database Two Is Identified as a preferred aggregate store:
In response to the example query, the following actions would occur:

1. It still might copy the product table to Database One, to optimize future queries that require a join between the sales history table and the Product table.
2. It may decide to create an aggregate table, grouping the "total value" measure either by product ID or by product category in Database Two. Database Two is chosen specifically because of its designation as a preferred aggregate store.

Once completed, subsequent requests for the same query can be answered very quickly from the locally hosted relational database server (Database Two).

If the Product Table Isn't Located in Database Two:

Even if the example is changed so that the Product table is located in Database One, the designation of the preferred aggregate store enabled the query system 200 to make decisions about creating aggregates in fast storage that is "closer to" the query system 200 service, reducing query response times. This can be of particular importance if Database One is a database on which the system 200 has not been granted permission to write aggregations. In this situation, the preferred aggregate store becomes the only viable location for aggregate tables to be stored.

In a query environment, a user or interactive application in the multidimensional database query environment 100 issues a relational database statement as a query request in SQL or MDX. The interactive application defines a GUI for query entry and provides a visual display for the query result; an output file may also be used. The query engine 110 receives the relational database statement, which defines conditional logic for accessing a plurality of fields, where each field corresponds to a respective dimension of stored data. A portion of the data is identified to include one or more of the plurality of fields. The identified portion may be a subquery defined by a join of two or more dimensions in the query request, for example. The subquery may represent a portion of co-located or disparate fields that occupy substantial storage, require substantial computing resources to join and/or are repeatedly called on by other parts/subqueries in the full relational database statement. Either the values of the data fields of the dimension, the result of the joined fields, or both, may be stored as the aggregate. Depending on what data values are employed in the overall query request, the query engine 110 may compute the aggregate by processing the join and storing the result in the preferred aggregate store. The corresponding subquery may include a join of dimensions stored in a common data store, or include dimensions from different data stores, which are then stored together in the preferred aggregate store.

Since processing of the full query request need not recompute or continually refetch the values or dimensions in the stored aggregate, efficiency and performance of the computer system supporting the query engine is achieved. In contrast, had the preferred aggregate store not been invoked, full query processing would have incurred network access and retrieval overhead from the remote data store to repeatedly fetch the dimensions called for by the aggregate.

Other common scenarios benefitting from usage of the preferred aggregate are those where the underlying data originates from a remote service that is accessed using an API over a network and that service does not support the creation of additional tables (containing pre-aggregations or anything else). Examples of this are Web-hosted customer relationship management (CRM) services, service-request tracking services, inventory management services, etc.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a multidimensional database having a plurality of data sources at different network locations, each network location contributing one or more fields for satisfying a query request, a method for generating and storing aggregates, comprising:
   identifying a plurality of data sources used in satisfying a query request, each data source of the plurality of date sources located in a distinct network location of the network;
   determining an aggregate defined by a portion of data in one or more of the data sources of the plurality of data sources used in satisfying the query;
   receiving a designation of a preferred aggregate store, the preferred aggregate store having a more favorable access path than the data source from which the determined aggregate emanates;
   identifying, for each of the plurality of data sources, a network cost associated with obtaining a respective portion of data in each of the plurality of data sources;
   designating the preferred aggregate store from the data source corresponding to the lowest network cost from among the plurality of data sources having a portion of the data for satisfying the query; and
   computing the aggregate by moving the corresponding portion of data in one or more of the data sources of the plurality of data sources to the preferred aggregate store for satisfying the query request.

2. The method of claim 1 further comprising:
   computing an aggregate based on a first data store and a second data store, each of the first and second data stores having a portion of the data used in satisfying the query;
   determining that an intermediate data store is designated for storing the computed aggregate;
   comparing a network cost for accessing the computed aggregate at the intermediate data store with a network cost for accessing the computed aggregate from a preferred aggregate store; and
   based on the comparison, storing the computed aggregate at the preferred aggregate store.

3. The method of claim 1 wherein the network cost includes one or more of a data access subscription, write access privileges, transmission time, and cloud storage fees.

4. The method of claim 1 further comprising:
generating the aggregate from a join of dimensional data from the portion of data at each respective data source of the plurality of data sources;
storing the join at the preferred aggregate store; and
generating the query result from accessing the join.

5. The method of claim 1 further comprising:
receiving a relational database statement, the relational database statement defining conditional logic for accessing a plurality of fields, each field corresponding to a respective dimension identified in the query request;
identifying the portion of data as including one or more of the plurality of fields.

6. The method of claim 5 further comprising:
identifying a subquery defined by a join of two or more dimensions in the query request; and
computing the aggregate by processing the join and storing the result in the preferred aggregate store.

7. The method of claim 6 wherein the subquery includes a join of dimensions stored in a common data store.

8. The method of claim 6 wherein the subquery includes dimensions from different data stores.

9. In a multidimensional database having a plurality of data sources at different network locations, each network location contributing one or more fields for satisfying a query request, a computing device for generating and storing aggregates, comprising:
a memory;
a processor;
an interface, implemented by the processor, to a plurality of data sources used in satisfying a query request, each data source of the plurality of date sources located in a distinct network location of the network;
query logic, implemented by the processor, to determine an aggregate defined by a portion of data in one or more of the data sources of the plurality of data sources used in satisfying the query;
an interface, implemented by the processor, to a preferred aggregate store having a more favorable access path than the data source from which the determined aggregate emanates;
network logic, implemented by the processor, to identify, for each of the plurality of data sources, a network cost associated with obtaining a respective portion of data in each of the plurality of data sources;
processing logic, implemented by the processor, to designate the preferred aggregate store from the data source corresponding to the lowest network cost from among the plurality of data sources having a portion of the data for satisfying the query; and
the processing logic further configured to computing the aggregate by moving the corresponding portion of data in one or more of the data sources in the plurality of data sources to the preferred aggregate store for satisfying the query request.

10. The device of claim 9, wherein the processing logic is further configured to:
compute an aggregate based on a first data store and a second data store, each of the first and second data stores having a portion of the data used in satisfying the query;
determine that an intermediate data store is designated for storing the computed aggregate;
compare a network cost for accessing the computed aggregate at the intermediate data store with a network cost for accessing the computed aggregate from a preferred aggregate store; and
based on the comparison, store the computed aggregate at the preferred aggregate store.

11. The device of claim 9, wherein the network cost includes one or more of a data access subscription, write access privileges, transmission time, and cloud storage fees.

12. The device of claim 9, wherein the query logic is further configured to:
generate the aggregate from a join of dimensional data from the portion of data at each respective data source of the plurality of data sources;
store the join at the preferred aggregate store; and
generate the query result from accessing the join.

13. The device of claim 9, further comprising:
an interface, implemented by the processor, to receive a relational database statement, the relational database statement defining conditional logic for accessing a plurality of fields, each field corresponding to a respective dimension identified in the query request, wherein the query logic is configured to identify the portion of data as including one or more of the plurality of fields.

14. The device of claim 13, further comprising:
a subquery defined by a join of two or more dimensions in the query request; and
the aggregate computed by processing the join and storing the result in the preferred aggregate store.

15. The device of claim 14, wherein the subquery includes a join of dimensions stored in a common data store.

16. The device of claim 14, wherein the subquery includes dimensions from different data stores.

17. A computer product embodying program code on a non-transitory computer readable medium that, when executed by a processor, performs steps for implementing a method for generating and storing aggregates in multidimensional database having a plurality of data sources at different network locations, each network location contributing one or more fields for satisfying a query request, the method comprising:
identifying a plurality of data sources used in satisfying a query request, each data source of the plurality of date sources located in a distinct network location of the network;
determining an aggregate defined by a portion of data in one or more of the data sources of the plurality of data sources used in satisfying the query;
receiving a designation of a preferred aggregate store, the preferred aggregate store having a more favorable access path than the data source from which the determined aggregate emanates;
identifying, for each of the plurality of data sources, a network cost associated with obtaining a respective portion of data in each of the plurality of data sources;
designating the preferred aggregate store from the data source corresponding to the lowest network cost from among the plurality of data sources having a portion of the data for satisfying the query; and
computing the aggregate by moving the corresponding portion of data in one or more of the data sources of the plurality of data sources to the preferred aggregate store for satisfying the query request.

* * * * *